(12) United States Patent
Donnelly et al.

(10) Patent No.: US 12,215,626 B2
(45) Date of Patent: Feb. 4, 2025

(54) METHOD OF STARTING A GAS TURBINE ENGINE

(71) Applicant: ROLLS-ROYCE plc, London (GB)

(72) Inventors: David M. Donnelly, Bristol (GB); Caroline L. Turner, Bristol (GB); Derek S. Wall, Bristol (GB); Peter F. Douglas, Bristol (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/488,217

(22) Filed: Oct. 17, 2023

(65) Prior Publication Data

US 2024/0133314 A1 Apr. 25, 2024
US 2024/0229674 A9 Jul. 11, 2024

(30) Foreign Application Priority Data

Oct. 21, 2022 (GB) ...................................... 2215610

(51) Int. Cl.
*F02C 7/26* (2006.01)
*F02C 6/00* (2006.01)
*F02C 9/28* (2006.01)
*F01D 19/00* (2006.01)

(52) U.S. Cl.
CPC .................. *F02C 7/26* (2013.01); *F02C 6/00* (2013.01); *F02C 9/28* (2013.01); *F01D 19/00* (2013.01)

(58) Field of Classification Search
CPC ...... F02C 7/26; F02C 9/28; F02C 6/00; F01D 19/00
See application file for complete search history.

(56) References Cited

U.S. PATENT DOCUMENTS

2011/0040470 A1* 2/2011 Qiu ......................... F01D 19/00
 701/100
2012/0072194 A1 3/2012 Arnold et al.
(Continued)

OTHER PUBLICATIONS

Great Britain search report dated Apr. 21, 2023, issued in GB Patent Application No. 2215610.3.
(Continued)

*Primary Examiner* — William H Rodriguez
(74) *Attorney, Agent, or Firm* — Shumaker & Sieffert, P.A.

(57) ABSTRACT

There is provided a method of starting a gas turbine engine, comprising: selecting a baseline starting procedure of the gas turbine engine based on environmental data; receiving condition information for the gas turbine engine and/or for a starting system of the gas turbine engine, the condition information comprising at least one of: health information for the gas turbine engine and/or the starting system; maintenance information for the gas turbine engine and/or the starting system; and operation information relating to an expected future usage of the gas turbine engine. The method further comprises determining a predicted degradation profile for the gas turbine engine and/or the starting system based on the condition information; determining a starting procedure of the gas turbine engine by adapting the baseline starting procedure based on the predicted degradation profile; and controlling the gas turbine engine and/or the starting system according to the determined starting procedure.

10 Claims, 5 Drawing Sheets

(56) References Cited

U.S. PATENT DOCUMENTS

| | | |
|---|---|---|
| 2015/0185716 A1* | 7/2015 | Wichmann ............... F02C 9/28 |
| | | 700/287 |
| 2016/0281607 A1 | 9/2016 | Asati et al. |
| 2017/0234167 A1 | 8/2017 | Stachowiak et al. |
| 2020/0200091 A1 | 6/2020 | Lockmiller et al. |
| 2022/0403786 A1 | 12/2022 | Conte et al. |

OTHER PUBLICATIONS

European search report dated Mar. 25, 2024, issued in EP Patent Application No. 23198690.2.

* cited by examiner

METHOD OF STARTING A GAS TURBINE ENGINE

CROSS-REFERENCE TO RELATED APPLICATIONS

This specification is based upon and claims the benefit of priority from UK Patent Application No. GB 2215610.3, filed on 21 Oct. 2022, which is hereby incorporated herein in its entirety.

BACKGROUND

Technical Field

The present disclosure relates to a method of starting a gas turbine engine, a system for starting a gas turbine engine, a method of determining a starting order of a plurality of gas turbine engines, and a system for determining a starting order of a plurality of gas turbine engines.

Description of the Related Art

A gas turbine engine comprises, in axial flow series, a compressor, a combustor, and a turbine. Typically, gas turbine engines are started using a starting system which is used to cause the compressor to rotate. The starting system can typically include electric motor starter/generators or air starters. The starting system provides torque to cause the compressor to rotate and provides such torque assistance until the gas turbine engine can achieve successful ignition and sustain its rotational speed.

The starting of a gas turbine engine typically follows a fixed procedure relating to one or more parameters of the starting system and/or the gas turbine engine. This fixed starting procedure is used throughout the operational life of the gas turbine engine. The starting procedure is typically set such that it aims to reliably enable start of the engine in all the expected conditions of the engine throughout its operational life. However, this means that the engine, starting equipment and/or the starting procedure may not always be able to provide optimal performance.

Some applications of gas turbine engines use multiple engines in parallel. In these applications, the order in which the engines are started may be fixed. For example, the set of engines can be started in the same order for every operation, or the engines can be started in an alternating order for every operation. The use of a fixed starting order can mean that optimal performance is not delivered by the set of gas turbine engines.

There is therefore a need to develop a method of starting a gas turbine engine which addresses at least some of the aforementioned problems.

SUMMARY

According to a first aspect of the present disclosure, there is provided a method of starting a gas turbine engine, comprising: selecting a baseline starting procedure of the gas turbine engine based on environmental data for an environment around the gas turbine engine; receiving condition information for the gas turbine engine and/or for a starting system of the gas turbine engine, the condition information comprising at least one of: health information for the gas turbine engine and/or the starting system; maintenance information for the gas turbine engine and/or the starting system; and operation information relating to an expected future usage of the gas turbine engine; the method further comprising determining a predicted degradation profile for the gas turbine engine and/or the starting system based on the condition information; determining a starting procedure of the gas turbine engine by adapting the baseline starting procedure based on the predicted degradation profile; and controlling the gas turbine engine and/or the starting system according to the determined starting procedure.

Adapting the baseline starting procedure may comprise at least one of: adapting one or more fault limits for one or more starting parameters for the baseline starting procedure; adapting a torque-power relationship for the baseline starting procedure; adapting a fuel schedule for the baseline starting procedure; and adapting one or more variable geometry features of the gas turbine engine for the baseline starting procedure.

The method may further comprise: monitoring operation of the gas turbine engine and/or the starting system during the starting procedure; determining a starting status of the gas turbine engine and/or starting system based on an assessment of the monitored operation with respect to the determined starting procedure; and adjusting the starting procedure based on the updated starting status.

The method may further comprise: receiving updated environmental data; and adjusting the starting procedure based on the updated environmental data.

Adjusting the starting procedure based on the starting status may comprise at least one of: adjusting the one or more fault limits of the starting procedure, adjusting the torque-power relationship of the starting procedure, adjusting the fuel schedule for the starting procedure, adapting the one or more variable geometry features of the gas turbine engine for the starting procedure; and aborting the starting procedure.

The maintenance information may comprise at least one of a time to a next scheduled maintenance event and a type of the next scheduled maintenance event.

The operation information may comprise an expected operation of the gas turbine engine until the next scheduled maintenance event.

The health information may comprise at least one of a degradation level and a remaining operational life of the gas turbine engine and/or starting system.

In a second aspect of the present disclosure, there is provided a system for starting a gas turbine engine, comprising: a starting system configured to start the gas turbine engine; processing circuitry coupled to the gas turbine engine and the starting system, the processing circuitry configured to execute instructions comprising: selecting a baseline starting procedure of the gas turbine engine based on environmental data for an environment around the gas turbine engine; receiving condition information for the gas turbine engine and/or for a starting system of the gas turbine engine, the condition information comprising at least one of: health information for the gas turbine engine and/or the starting system; maintenance information for the gas turbine engine and/or the starting system; and operation information relating to an expected future usage of the gas turbine engine; the instructions further comprising determining a predicted degradation profile for the gas turbine engine and/or the starting system based on the condition information; determining a starting procedure of the gas turbine engine by adapting the baseline starting procedure based on the predicted degradation profile; and controlling the gas turbine engine and/or the starting system according to the determined starting procedure.

The system may further comprise at least one sensor configured to monitor operation of the gas turbine engine and/or the starting system during the starting procedure. The instructions may further comprise determining a starting status of the gas turbine engine and/or the starting system based on an assessment of the monitored operation with respect to the determined starting procedure; and adjusting the starting procedure based on the updated starting status.

In a third aspect of the present disclosure, there is provided a method of determining a starting order of a plurality of gas turbine engines, comprising: receiving condition information for each gas turbine engine of the plurality of gas turbine engines and/or for a respective starting system of each gas turbine engine, the condition information comprising at least one of: health information for each gas turbine engine and/or the respective starting system; maintenance information for each gas turbine engine and/or the respective starting system; and operation information relating to an expected future usage of the gas turbine engine; the method further comprising determining the starting order of the plurality of gas turbine engines based on the condition information of each of the plurality of gas turbine engines and/or respective starting systems.

The maintenance information may comprise at least one of a time to a next scheduled maintenance event and a type of the next scheduled maintenance event of each gas turbine engine and/or the respective starting system.

The health information may comprise at least one of a degradation level and a remaining operational life of the gas turbine engine and/or starting system.

Determining the starting order based on the condition information may comprise determining a predicted degradation profile for each gas turbine engine and/or the respective starting system.

Determining the starting order of the gas turbine engines may comprise setting the starting order to align the predicted degradation profiles for the plurality of gas turbine engines and/or the respective starting systems.

The method may further comprise selecting a baseline starting procedure of each gas turbine engine based on environmental data for an environment around each gas turbine engine; determining a predicted degradation profile for each gas turbine engine and/or the respective starting system based on the condition information; determining a starting procedure of each gas turbine engine by adapting the baseline starting procedure based on the predicted degradation profile; and controlling each gas turbine engine and/or the respective starting system according to the determined starting procedure.

According to a fourth aspect of the present disclosure, there is provided a system for starting a plurality of gas turbine engines, comprising: a starting system associated with each of the plurality of gas turbine engines; processing circuitry coupled to the gas turbine engines and their respective starting systems, the processing circuitry configured to execute instructions comprising: receiving condition information for each gas turbine engine of the plurality of gas turbine engines and/or for a respective starting system of each gas turbine engine, the condition information comprising at least one of: health information for each gas turbine engine and/or the respective starting system; maintenance information for each gas turbine engine and/or the respective starting system; and operation information relating to an expected future usage of the gas turbine engine; the method further comprising determining the starting order of the plurality of gas turbine engines based on the condition information of each of the plurality of gas turbine engines and/or respective starting systems.

The instructions may further comprise selecting a baseline starting procedure of each gas turbine engine based on environmental data for an environment around each gas turbine engine; determining a predicted degradation profile for each gas turbine engine and/or the respective starting system based on the condition information; determining a starting procedure of each gas turbine engine by adapting the baseline starting procedure based on the predicted degradation profile; and controlling each gas turbine engine and/or the respective starting system according to the determined starting procedure.

DESCRIPTION OF THE DRAWINGS

Embodiments will now be described by way of example only, with reference to the Figures, in which.

DETAILED DESCRIPTION

Figure 1:
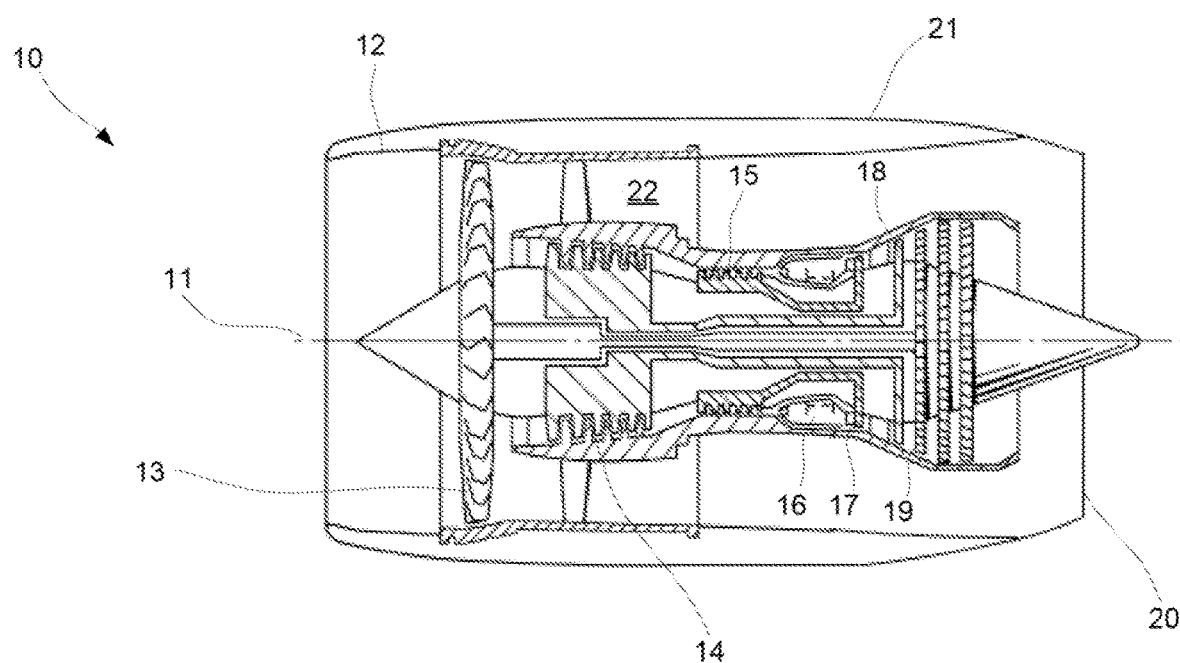
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high-pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g., two) and/or an alternative number of compressors and/or turbines. Further, the engine may comprise a gearbox provided in the drive train from a turbine to a compressor and/or fan. Gas turbine engines need to be started by a starting system, which applies a torque to the high-pressure compressor to cause it to rotate. In a typical starting procedure, the starting system is first operated to cause the high-pressure compressor to rotate. At a certain rotation speed, fuel is sprayed into the combustor. An ignitor attempts to ignite the fuel-air mixture. The rotation speed of the high-pressure compressor continues to increase, and at a certain speed, the air flow through the engine is sufficient to allow the ignitor to ignite the fuel. This speed is referred to as the "light-up speed". The compressor speed continues to increase, and the turbine begins to rotate due to the warm air resulting from ignition. At this point, the rotation of the turbine also drives the rotation of the compressor, and the engine rotation is self-sustaining, in that the engine is rotating at a speed fast enough to supply air into the combustor at the required rate. At this point, the assistance from the starter system is no longer needed and the starter system can be disengaged. The engine continues to speed up, eventually settling at an idle speed.

Figure 2:
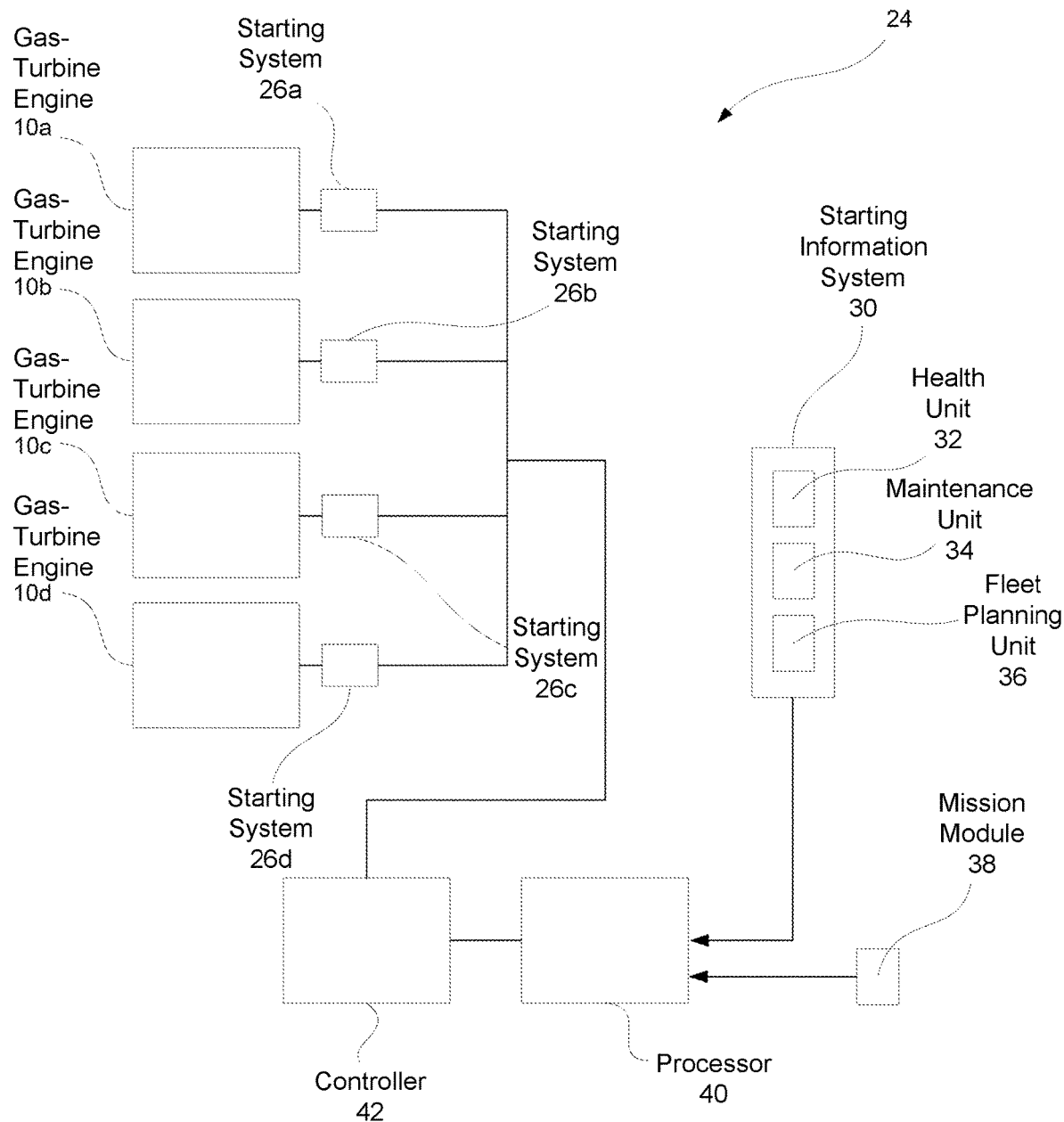
FIG. 2 is a schematic view of an example system for determining a starting order of a plurality of gas turbine engines.

FIG. 2 shows an example system 24 for determining a starting order of a plurality of gas turbine engines 10a-10d. The system comprises four gas turbine engines 10a-10d. Each gas turbine engine 10a-10d is associated with a starting system 26a-26d. The system 24 further comprises a starting information system (SIS) 30 and a mission module 38. A processor 40 is operatively coupled with the SIS 30 and mission module 38. A starter controller 42 is operatively coupled with the processor 40.

The gas turbine engines 10a-10d are aircraft gas turbine engines and form part of a single aircraft. Each starting system 26a-26d is configured to start a respective one of the plurality of gas turbine engines 10a-10d. The starting system 26a-26d comprises an electric starter comprising an electric motor powered by an energy storage source or a electric power source. In other examples, the starting system 26a-26d may comprise, for example, an electric starter-generator, an air starter, a hydraulic starter, or a mechanical coupling. The starting system 26a-26d is configured to provide torque to the shaft of the high-pressure compressor 15 of the gas turbine engine 10a-10d, to cause it to rotate. The starting system 26a-26d may also comprise other components or subsystems associated with the starting procedure of the gas turbine engine 10a-10d, for example, an ignition system.

The SIS 30 comprises one or more sub-units which are configured to provide condition information relating to each gas turbine engine 10a-10d and/or its respective starting system 26a-26d. The SIS 30 comprises a health unit 32, a maintenance unit 34, and a fleet planning unit 36. Each of these units provides one or more inputs to the overall condition information. The SIS 30 is remote from the aircraft. In other examples, each of the sub-units including the health unit 32, the maintenance unit 34, and the fleet planning unit 36 may each be provided as separate units which are not part of a larger starting information system (SIS) 30. In these examples, each of the health unit 32, the maintenance unit 34, and the fleet planning unit 36 may be individually communicatively coupled to the processor 40.

The health unit 32 is configured to provide health information for each gas turbine engine 10a-10d and/or its respective starting system 26a-26d. The health information comprises information relating to the use and wear of the gas turbine engine 10a-10d and the starting system 26a-26d. The health information may include a degradation level which indicates a level of degradation of the gas turbine engine 10a-10d and/or the starting system 26a-26d relative to a brand new or unused gas turbine engine 10a-10d or starting system 26a-26d, respectively. For example, the degradation level may be expressed as a percentage. The health information may also or alternatively include a measure of the remaining operational life of the gas turbine engine 10a-10d and/or starting system 26a-26d. The remaining operational life can be determined by subtracting a used operational life from the total operational life. The total operational life relates to the recommended operational time of the gas turbine engine 10a-10d and/or starting system 26a-26d before the gas turbine engine 10a-10d or the starting system 26a-26d requires replacement or repair. This may be provided by a manufacturer and may be based on experimental data. The total operational life may be expressed in terms of time e.g., in hours or days, or in terms of a total number of starts. The used operational life is determined by the amount of time the gas turbine engine 10a-10d and/or starting system 26a-26d has already been operational for. The used operational life may also take into account the type of prior use of the gas turbine engine 10a-10d and/or the starting system 26a-26d, for example the environmental conditions under which the gas turbine engine 10a-10d and/or the starting system 26a-26d were used. Both the degradation level and the remaining operational life can be provided for the gas turbine engine 10a-10d and/or the starting system 26a-26d as whole systems, and also for individual components of the gas turbine engine 10a-10d and the respective starting system 26a-26d. The health information may be provided by an operator of the system.

The maintenance unit 34 is configured to receive maintenance information for each gas turbine engine 10a-10d and/or its respective starting system 26a-26d. Maintenance information comprises information relating to the maintenance schedule of the gas turbine engine 10a-10d and/or its respective starting system 26a-26d. The maintenance schedule relates to the intervals at which components or systems of the gas turbine engine 10a-10d and/or starting system 26a-26d are required to undergo maintenance. Maintenance can include inspection, cleaning, repair, or replacement. Maintenance information can therefore include a time until the next scheduled maintenance event or a type and/or scope of the next scheduled maintenance event. The scope of the next scheduled maintenance event may specify which component or system is the subject of the next scheduled maintenance event. In addition, the type of the next scheduled maintenance event may specify whether the next scheduled maintenance event is an on-wing maintenance event, an off-wing maintenance event, or a complete replacement. The maintenance information can be provided by an operator of the system or a manufacturer.

The fleet management unit 36 is configured to receive operation information, which comprises information relating to the expected future usage of the aircraft until the next scheduled maintenance event. For example, the operation information may comprise an expected operational time until the next scheduled maintenance event and/or a type of operation until the next scheduled maintenance event. The operation information can be provided by an operator of the system.

The mission module 38 is configured to receive mission information, which relates to the upcoming mission or flight to be undertaken by the aircraft. For example, the mission information may comprise a type of start required for the upcoming mission or flight. The mission information can be provided by an operator of the system. The mission module 38 may be located on-board the aircraft.

The processor 40 is configured to receive the condition information from the SIS 30. The processor 40 is also configured to receive the mission information from the mission module 38. The processor 40 is configured to use the condition information to determine a starting order of the plurality of gas turbines 10a-10d.

The processor 40 may be configured to compare the inputs to the condition information to determine the starting order of the plurality of gas turbines 10a-10d. For example, the processor may be configured to compare the health information, the maintenance information, and the operation information to determine the starting order. This comparison may include determining a ranking for the gas turbines 10a-10d based on their respective condition information. For example, where the maintenance information includes a time until the next scheduled maintenance event and the health information includes a remaining operational life of the gas turbine engine 10a-10d and/or starting system 26a-26d, the processor 40 may be configured to first compare the time until the next scheduled maintenance event for each of the gas turbine engines 10a-10d and/or respective starting systems 26a-26d. If it is determined that the time until the next scheduled maintenance event for each of the gas turbine engines 10a-10d and/or respective starting systems 26a-26d is the same, the processor may be configured to then compare the remaining operational life of the gas turbine engines 10a-10d and/or the respective starting systems 26a-26d. The gas turbine engines 10a-10d and/or the respective starting systems 26a-26d may be ranked in terms of their remaining operational life. The gas turbine engine 10a-10d and/or the starting system 26a-26d with the most remaining operational life may be ranked first. The processor 40 may be configured to determine the starting order of the gas turbine engines 10a-10d according to this ranking. Alternatively, if it is determined that the time until the next scheduled maintenance event for each of the gas turbine engines 10a-10d and/or respective starting systems 26a-26d is not the same, the processor 40 may be configured to rank the gas turbine engines 10a-10d and/or the respective starting systems 26a-26d in terms of their time until the next scheduled maintenance event. The gas turbine engine 10a-10d and/or the starting system 26a-26d with the soonest scheduled maintenance event may be ranked first. The processor 40 may be configured to determine the starting order of the gas turbine engines 10a-10d according to this ranking.

Alternatively, the processor 40 may be configured to analyse the condition information together with the mission information to determine a predicted degradation profile for each gas turbine engine 10a-10d and/or its respective starting system 26a-26d. The predicted degradation profile comprises a prediction of how the gas turbine engine 10a-10d and/or the respective starting system 26a-26d, or components thereof, will degrade over time. The predicted degradation profile may therefore provide an estimate of when in the future a component or a system of the gas turbine engine and/or starting system is expected to degrade to an unacceptable level, i.e., below a predetermined threshold. The processor is configured to select a predicted degradation profile based on any suitable correlation between the condition information and predicted degradation data. Optionally, the predicted degradation profile may also be estimated based on any suitable correlation between the condition information, the mission information, and predicted degradation data. For example, in either case, the processor may refer to a look-up table or database containing predetermined correlations. In the table or database, the one or more inputs to the condition information (and optionally, the mission information) may correspond to predetermined predicted degradation profiles for the gas turbine engine 10a-10d, the respective starting system 26a-26d, and/or individual components or subsystems thereof. These predetermined predicted degradation profiles may be determined from experimental data or from best practice calculations. The processor 40 can look up the inputs to the condition information (and optionally, the mission information) in the table to find the most appropriate predicted degradation profile for the gas turbine engine 10a-10d and/or starting system 26a-26d. The table or database may be set or updated, for example based on updated best practice calculation or to reflect changes to the hardware of the gas turbine engine 10a-10d and/or the starting system 26a-26d.

In an alternative example, the processor 40 may refer to a degradation model which correlates the inputs from the condition information with a predicted degradation profile. The predicted degradation profile can be selected based on only one or more of the inputs to the condition information. For example, maintenance information and operation information may not be available, and the processor can select the predicted degradation profile based on just the health information, using the degradation model. The degradation model may be an artificial intelligence model, for example a linear regression model, a deep neural network or a decision tree. The degradation model may be trained using experimental data or historical degradation data. For example, the degradation model may form a digital twin. The degradation model may be updated based on updated real-life degradation data and developments or changes in the hardware of the gas turbine engine and/or the starting system.

The processor 40 may also determine, based on the condition information, and optionally the mission information, that one or more components or subsystems of the gas turbine engine 10a-10d and/or starting system 26a-26d are degraded above a threshold level and require maintenance before the gas turbine engine 10a-10d can be started. At which point, maintenance can be performed, and the condition information can be updated.

The processor 40 can use the predicted degradation profile to determine the starting order of the gas turbine engines 10a-10d. For example, the processor can compare the predicted degradation profile for each gas turbine engine 10a-10d and/or its respective starting system 26a-26d. Based on this comparison, the processor 40 can determine the order in which the plurality of gas turbine engines 10a-10d and/or respective starting systems 26a-26d are predicted to degrade past a threshold level. In addition, the processor can determine how the plurality of gas turbine engines 10a-10d and/or their respective starting systems 26a-26d are predicted to degrade with respect to their maintenance schedules. The processor 40 is configured to determine the starting order of the plurality of gas turbines 10a-10d by selecting a starting order which aligns the predicted degradation profiles of the gas turbine engines 10a-10d and/or the respective starting systems 26a-26d. For example, a first one 10a of the gas turbine engines 10a-10d may be predicted to degrade at a faster rate than the second 10b, third 10c, and fourth 10d gas turbine engines. In this case, the starting order may be set such that the first gas turbine engine 10a is last in the starting order. This means that during a start-up procedure, the first gas turbine engine 10a will be operated for less time than the second 10b, third 10c, and fourth 10d gas turbine engines, thereby experiencing relatively lower degradation.

By aligning the degradation profiles, the degradation of the gas turbine engines 10a-10d and/or the starting systems 26a-26d can be brought to even levels relative to one another. When the expected degradation profiles are aligned, the gas turbine engines 10a-10d and/or starting systems 26a-26d will be expected to degrade in a similar manner. Consequently, the maintenance schedules of the gas turbine engines 10a-10d and/or starting systems 26a-26d can be brought into alignment, requiring maintenance at similar time intervals. This reduces the number of overall maintenance events required for the aircraft.

Figure 3:
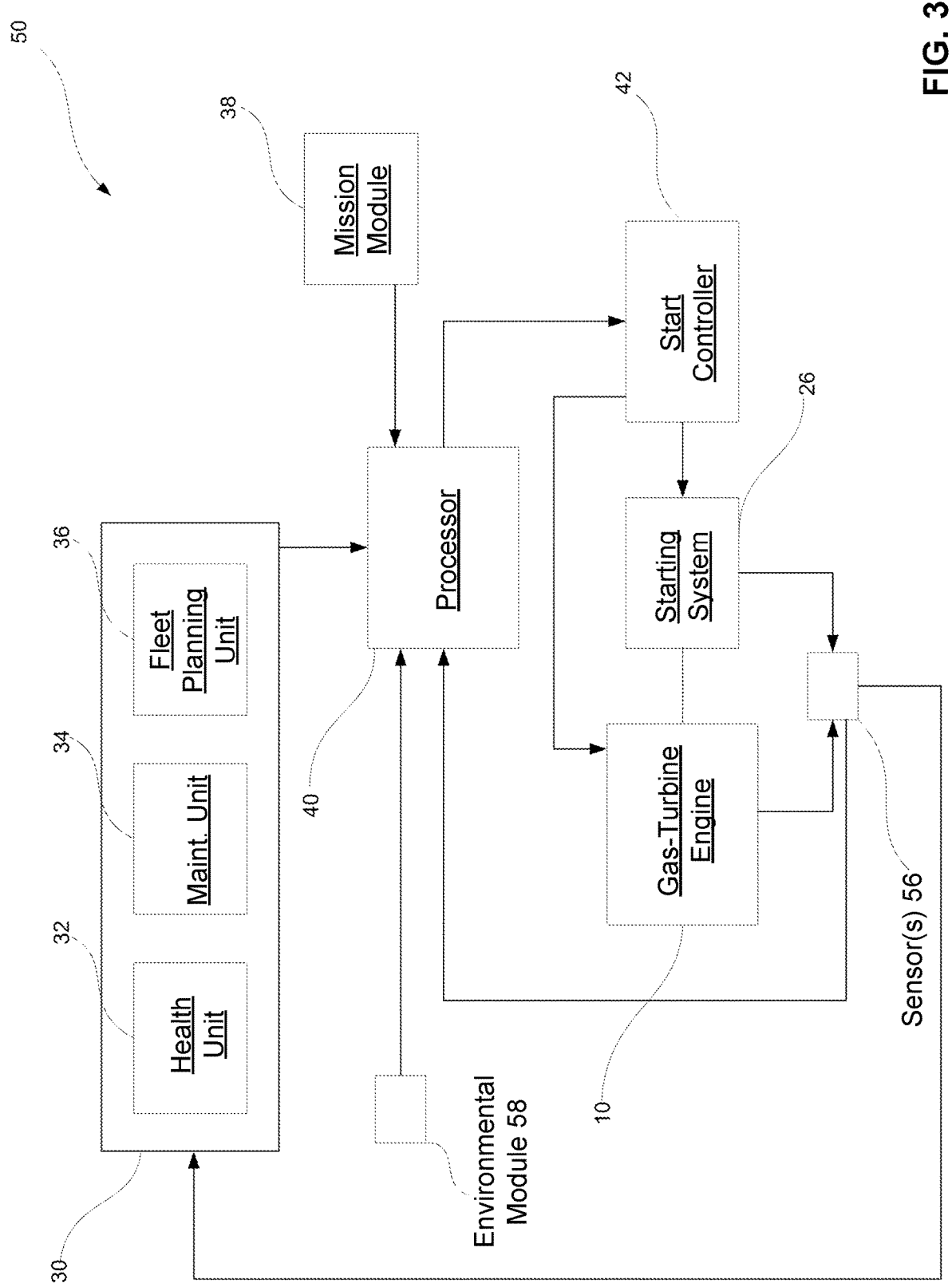
FIG. 3 is a schematic view of an example system for starting a gas turbine engine.

FIG. 3 shows an example system 50 for starting a gas turbine engine 10. The system comprises a gas turbine engine 10, a starting system 26 for the gas turbine engine 10, a processor 40, a start controller 42, a starting information system (SIS) 30, a mission module 38, and an environmental module 58. The gas turbine engine 10 is part of an aircraft. The gas turbine engine may be one of a plurality of gas turbine engines 10, each having a respective starting system 26, similar to the arrangement described with reference to FIG. 2. The SIS 30 is remote from the gas turbine engine 10 and the starting system 26. The processor is also remote from the gas turbine engine 10 and the starting system 26. The mission module 38 is located on-board the aircraft.

The starting system is configured to actuate start of the gas turbine engine, as discussed previously. The starting system 26 comprises an electric starter comprising an electric motor powered by an energy storage source or an electric power source. In other examples, the starting system 26 may comprise, for example, an electric starter-generator, an air starter, a hydraulic starter, or a mechanical coupling. The starting system 26 is configured to provide torque to one or more shafts of the gas turbine engine 10, to cause it to rotate. The starting system 26 may also comprise other components or subsystems associated with the starting procedure of the gas turbine engine 10, for example, an ignition system.

The SIS 30 is substantially similar to that which was described with reference to the system of FIG. 2 and comprises one or more sub-units configured to provide condition information for the gas turbine engine 10 and/or the starting system 26. The SIS 30 comprises a health unit 32, a maintenance unit 34, and a fleet planning unit 36. Each of these units provides one or more inputs to the condition information.

The health unit 32 is configured to provide health information for the gas turbine engine 10 and/or the starting system 26. The health information comprises information relating to the use and wear of the gas turbine engine 10 and/or the starting system 26. The health information can include a degradation level which indicates a level of degradation of the gas turbine engine 10 and/or the starting system 26 relative to a brand new or unused gas turbine engine 10 or starting system 26, respectively. For example, the degradation level may be expressed as a percentage. The health information may also or alternatively include a measure of the remaining operational life of the gas turbine engine 10 and/or starting system 26. The remaining operational life may be determined by subtracting a used operational life from the total operational life. The total operational life relates to the recommended operational time of the gas turbine engine 10 and/or starting system 26 before the engine or the system requires replacement or repair. This may be provided by a manufacturer and may be based on experimental data. The total operational life may be expressed in terms of time e.g., in hours or days. The used operational life is determined by the amount of time the gas turbine engine 10 and/or starting system 26 has already been operational for. The used operational life may also take into account the type of prior use of the gas turbine engine 10 and/or the starting system 26, for example the environmental conditions under which the gas turbine engine 10 and/or the starting system 26 were used. Both the degradation level and the remaining operational life can be provided for the gas turbine engine 10 and/or the starting system 26 as whole systems, and also for individual components of the gas turbine engine 10 and the respective starting system 26. The health information can be provided by an operator of the system.

The maintenance unit 34 is configured to provide maintenance information for the gas turbine engine 10 and/or the starting system 26. Maintenance information comprises information relating to the maintenance schedule of the gas turbine 10 and/or the starting system 26. The maintenance schedule relates to the intervals at which components or systems of the gas turbine engine 10 and/or starting system 26 are required to undergo maintenance. Maintenance can include inspection, cleaning, repair, or replacement. Maintenance information can therefore include a time until the next scheduled maintenance event, a type and/or scope of the next scheduled maintenance event. The scope of the next scheduled maintenance event may specify which component or system is the subject of the next scheduled maintenance event. In addition, the type of the next scheduled maintenance event may specify whether the next scheduled maintenance event is an on-wing maintenance event, an off-wing maintenance event, or a complete replacement. The maintenance information can be provided by a manufacturer or an operator of the system.

The fleet management unit 36 is configured to provide operation information, which comprises information relating to the expected usage of the gas turbine engine 10 until the next scheduled maintenance event. For example, the operation information may comprise an expected operational time until the next scheduled maintenance event and/or a type of operation until the next scheduled maintenance event. The operation information can be provided by an operator, fleet manager or a fleet management system.

The mission module 38 is configured to provide mission information, which relates to the upcoming mission or flight to be undertaken by the aircraft. For example, the mission information may comprise a type of start required for the upcoming mission or flight. The mission information can be provided by an operator of the aircraft.

The environmental module 58 is configured to provide environmental data for an environment around the gas turbine engine 10. For an aircraft gas turbine engine, the environment may be the environment around the aircraft. The environmental module 58 may include one or more environmental sensors. Environmental data may include, for example, an ambient temperature, wind speed, wind direction, air pressure and/or humidity.

The processor 40 is configured to receive the environmental data from the environmental module 58. Based on the environmental data, the processor 40 is configured to select a baseline starting procedure for the gas turbine engine 10. The baseline starting procedure may include one or more parameters governing the starting of the gas turbine engine 10. These parameters can relate to the starting system 26 and/or the gas turbine engine 10.

The parameters governing starting may relate to the operation of the starting system 26. For example, they may include the point at which the starting system 26 is disengaged during the starting procedure.

The parameters governing starting may include a torque-power relationship for the starting system 26 of the gas turbine engine 10. A torque-power relationship describes how the torque and power varies at different engine speeds and how quickly the torque and power can be delivered by the starting system 10.

The parameters governing starting may include a fuel schedule for the starting procedure. The fuel schedule relates to the amount and speed at which fuel is delivered to the combustor. The fuel schedule may comprise parameters relating to the operation of one or more fuel valves, fuel nozzles, and a fuel pump.

Some starting systems 26 may comprise a first starting system configured to provide torque to the high-pressure compressor 15 and a second starting system configured to provide a torque to the low-pressure compressor. In these examples, the parameters governing starting may relate to the operation of both the first and second starting systems.

The parameters governing starting may include one or more variable geometry features of the gas turbine engine 10. Variable geometry features may include variable blade angles, variable guide vane angles, variable bleed valves, and/or variable area nozzles.

The parameters governing starting may include one or more fault limits for one or more starting parameters of the gas turbine engine 10 and/or the starting system 26. A fault is indicated when the starting parameters fall outside the fault limits. The starting parameters may include one or more of temperature, pressure, fuel flow rate, shaft speed, or time, for example a time to reach light-up speed, or a time to reach idle speed.

The baseline starting procedure is selected based on the environmental data. For example, for relatively hot ambient conditions, a hot baseline starting procedure may be selected, and conversely, for relatively cool ambient conditions, a cold baseline starting procedure may be selected. If environmental conditions are considered normal (i.e. within normal limits), a normal baseline starting procedure may be selected.

The processor 40 is configured to receive the mission information from the mission module 38. The mission information may indicate that a start of the gas turbine engine 10 has been requested.

The processor 40 is configured to receive the condition information from the SIS 30. The processor 40 is configured to use the condition information to determine a predicted degradation profile for the gas turbine engine 10 and/or the starting system 26. The predicted degradation profile comprises a prediction of how the gas turbine engine 10 and/or the starting system 26, and components thereof, will degrade over time. The predicted degradation profile may therefore provide an estimate of the remaining operational life of a component or a system, based on the condition information.

The predicted degradation profile may be selected based on any suitable correlation between the condition information and predicted degradation. For example, the processor 40 may refer to a look-up table or database containing predetermined correlations. In the table or database, the one or more inputs to the condition information may correspond to predetermined predicted degradation profiles for the gas turbine engine 10, the starting system 26, and/or individual components or subsystems thereof. These predetermined predicted degradation profiles may be determined from experimental data or from best practice calculations. The processor 40 can look up the inputs to the condition information in the table to find the most appropriate predicted degradation profile for the gas turbine engine 10 and/or starting system 26. The table or database may be set or updated, for example based on updated best practice calculation or to reflect changes to the hardware of the gas turbine engine 10 and/or the starting system 26.

In an alternative example, the processor 40 may refer to a degradation model which correlates the inputs from the condition information a predicted degradation profile. The predicted degradation profile can be selected based on only one or more of the inputs to the condition information. For example, maintenance information and operation information may not be available, and the processor 40 can select the predicted degradation profile based on just the health information, using the degradation model. The degradation model may be an artificial intelligence model, for example a linear regression model, a deep neural network or a decision tree. The degradation model may be trained using experimental data or historical degradation data. The degradation model may be updated based on updated real-life data and developments or changes in the hardware of the gas turbine engine 10 and/or the starting system 26.

The processor 40 is configured to determine a starting procedure for the gas turbine engine 10 by adapting the baseline starting procedure based on the predicted degradation profile of the gas turbine engine 10 and/or starting system 26. Determining the starting procedure comprises adapting the one or more parameters governing the starting of the gas turbine engine 10. For example, if the predicted degradation profile indicates that the gas turbine engine 10 and/or the starting system 26 is at risk of failure before the next scheduled maintenance event, the baseline starting procedure may be adapted in a manner which aims to conserve the life of the gas turbine engine 10 and/or the starting system 26. In other examples, the baseline starting procedure may be adapted in a manner which aims to minimise energy consumption or fuel consumption.

The processor 40 may adapt the baseline starting procedure by adapting the operation of the starting system 26. The processor 40 may adapt the operation of the starting system 26 by adjusting the point at which the starting system 26 is disengaged during the starting procedure, based on the predicted degradation profile. The predicted degradation profile may indicate that the gas turbine engine 10 is in good condition. Such gas turbine engines 10 can perform effectively and have a relatively low light-up speed, which means that the starting system 26 can be disengaged at a relatively low speed. Conversely, the predicted degradation profile may indicate that the gas turbine engine 26 is significantly degraded. Such gas turbine engines 26 may not be able to perform as effectively and may have a relatively high light-up speed, which means that the starting system 26 can only be disengaged at a relatively high speed. Accordingly, the predicted degradation profile can be used to determine the point at which the starting system 26 can be disengaged. This enables the time of operation of the starting system 26 to be tailored to each gas turbine engine 10.

The processor 40 may adapt the baseline starting procedure by adapting the torque-power relationship based on the predicted degradation profile of the gas turbine engine 10 and/or starting system 26. For example, if the predicted degradation profile indicates that the gas turbine engine 10 and/or starting system 26 is predicted to degrade quickly and has a relatively low predicted remaining operational life, the processor 40 may adapt the torque-power relationship to maximise efficiency, for example by delivering torque and power over a relatively longer period of time. Such a starting procedure would be considered as providing a relatively gentle start to the gas turbine engine 10 and would be directed to conserving the operational life of the gas turbine engine 10. Conversely, if the predicted degradation profile indicates that the gas turbine engine 10 and/or starting system 26 has a long predicted operational life, the processor 40 may adapt the torque-power relationship to maximise performance, for example by delivering torque and power over a relatively short period of time. Such a starting procedure would be considered as providing a relatively aggressive start to the gas turbine engine.

The processor 40 may adapt the baseline starting procedure based on the predicted degradation profile, by adapting the fuel schedule for the baseline starting procedure. Adapting the fuel schedule may comprise adapting the operation of one or more fuel valves, fuel nozzles, and the fuel pump. For example, if the predicted degradation profile indicates that the gas turbine engine and/or starting system 26 has a long predicted operational life, the processor may adapt the fuel schedule to maximise performance, for example by delivering a greater amount of fuel to the combustor over a relatively short period of time.

If the starting system 26 comprises a first starting system configured to provide torque to the high-pressure compressor 15 and a second starting system configured to provide a torque to the low-pressure compressor, as described above, the processor 40 may adapt the baseline starting procedure by adapting the operation of both the first and second starting systems. For example, the processor 40 may determine that the second starting system should provide torque to the low-pressure compressor to assist the starting of the gas turbine engine 10 by the first starting system, based on the predicted degradation profile. The predicted degradation profile may indicate that the first starting system has degradation exceeding a predetermined threshold. In this case, the second starting system can be operated to provide torque to the low-pressure turbine, so that the first starting system requires a relatively lower torque to achieve light-up speed. The level of torque provided by the second starting system may be variable based on the level of degradation of the first starting system.

The processor 40 may adapt the baseline starting procedure by adapting one or more variable geometry features of the gas turbine engine 10, based on the predicted degradation profile. Variable geometry features may include variable blade angles, variable guide vane angles, variable bleed valves, and/or variable area nozzles. Based on the predicted degradation profile of the gas turbine engine 10 and/or the starting system 26, one or more of the variable geometry features may be adjusted to provide more efficient operation of the gas turbine engine 10 or provide greater performance. For example, the predicted degradation profile may indicate that the gas turbine engine 10 has significant degradation and/or is estimated to degrade quickly. The processor 40 may therefore adjust one or more variable geometry features to increase efficiency and preserve the operational life of the gas turbine engine 10.

The processor 40 is configured to adapt one or more fault limits for the one or more starting parameters of the baseline starting procedure based on the predicted degradation profile of the gas turbine engine 10 and/or starting system 26. For example, fault limits for a gas turbine engine 10 which is significantly degraded may be set to different levels than for a gas turbine engine which is brand new.

Once the starting procedure has been determined, the processor 40 is configured to transmit the determined starting procedure to the start controller 42. The start controller 42 may be part of the starting system 26 or the gas turbine engine 10. The processor is configured to transmit the determined starting procedure to the start controller 42 via a remote communications link, for example via a wireless network or a mobile communications network. The start controller 42 is operatively coupled to the starting system 26 and the gas turbine engine 10. The start controller 42 is configured to control the operation of the starting system 26 and/or the gas turbine engine 10 according to the determined starting procedure by sending control signals to the starting system 26 and/or the gas turbine engine 10.

One or more operating sensors 56 are configured to monitor the operation of the gas turbine engine 10 and/or starting system 26 during the starting procedure. The sensors 56 are configured to continuously monitor one or more operating parameters of the gas turbine engine 10 and/or the starting system 26 during the starting procedure. For example, for a starting system 26 comprising an electric motor, the sensors may continuously monitor the electric motor torque and a current and voltage for an electric power source (e.g., a battery). The sensors are configured to continuously monitor one or more operating parameters of the gas turbine engine; for example, temperature, pressure and/or torque.

The environmental module 58 comprises one or more environmental sensors configured to continuously monitor one or more environmental parameters relevant to the gas turbine engine 10. The environmental module 58 is therefore configured to provide updated environmental data for the environment around the gas turbine engine 10. The one or more environmental parameters may include, for example, an ambient temperature, wind speed, wind direction, air pressure and/or humidity.

The operating sensors 56 and the environmental module 58 are operatively coupled to the processor 40, such that the one or more operating parameters and one or more environmental parameters are transmitted to the processor 40. The operating parameters and environmental parameters are transmitted to the processor 40 in real-time. The processor 40 is configured to continuously analyse the operating parameters and environmental parameters with respect to the determined starting procedure to determine a starting status of the gas turbine engine and/or starting system. The starting status provides a real-time assessment of the gas turbine engine and/or starting system as they are operated according to the determined starting procedure. The starting status may be continuously updated based on the continuous monitoring of the operating parameters and the environmental parameters with respect to the determined starting procedure. The starting status may indicate that the gas turbine engine 10 and/or starting system 26 may not be able to perform the determined starting procedure. For example, the starting status may indicate that one or more operating limits for one or more starting parameters is likely to be exceeded.

The monitored operating parameters can be transmitted to the SIS 30 and form part of the condition information for the gas turbine engine 10 and the starting system 26. The monitored operating parameters may also be used to update the correlation or relationship between the condition information and the predicted degradation profile.

Upon determining the starting status, the processor 40 is configured to adapt the starting procedure based on the starting status. The processor 40 may be configured to continuously adapt the starting procedure based on the continuously updated starting status. For example, if the starting status indicates that the determined starting procedure is likely to result in a failed start of the gas turbine engine 10, the starting procedure is aborted. If the starting status indicates that one or more starting parameters are likely to or have crossed one or more operating limits, the processor 40 is configured to adapt the operation of the starting system or the gas turbine engine 10, for example by adapting the torque-power relationship, adjusting when the starting system is disengaged, adjusting the fuel schedule, and/or adapting one or more variable geometry features of the gas turbine engine 10. Further, the processor 40 is configured to adapt one or more fault limits for one or more starting parameters of the gas turbine engine 10 and/or the starting system 26, based on the starting status. The processor 40 is configured to transmit the adapted starting procedure to the start controller 42. The start controller 42 is configured to send one or more control signals to the gas turbine engine 10 and/or the starting system 26 to execute the adapted starting procedure. The processor is configured to update the starting status based on this adapted starting procedure, in a continuous process during starting. The starting procedure may be further adapted based on the updated starting status. The starting status therefore provides continuous feedback on the operation of the starting procedure.

Figure 4:
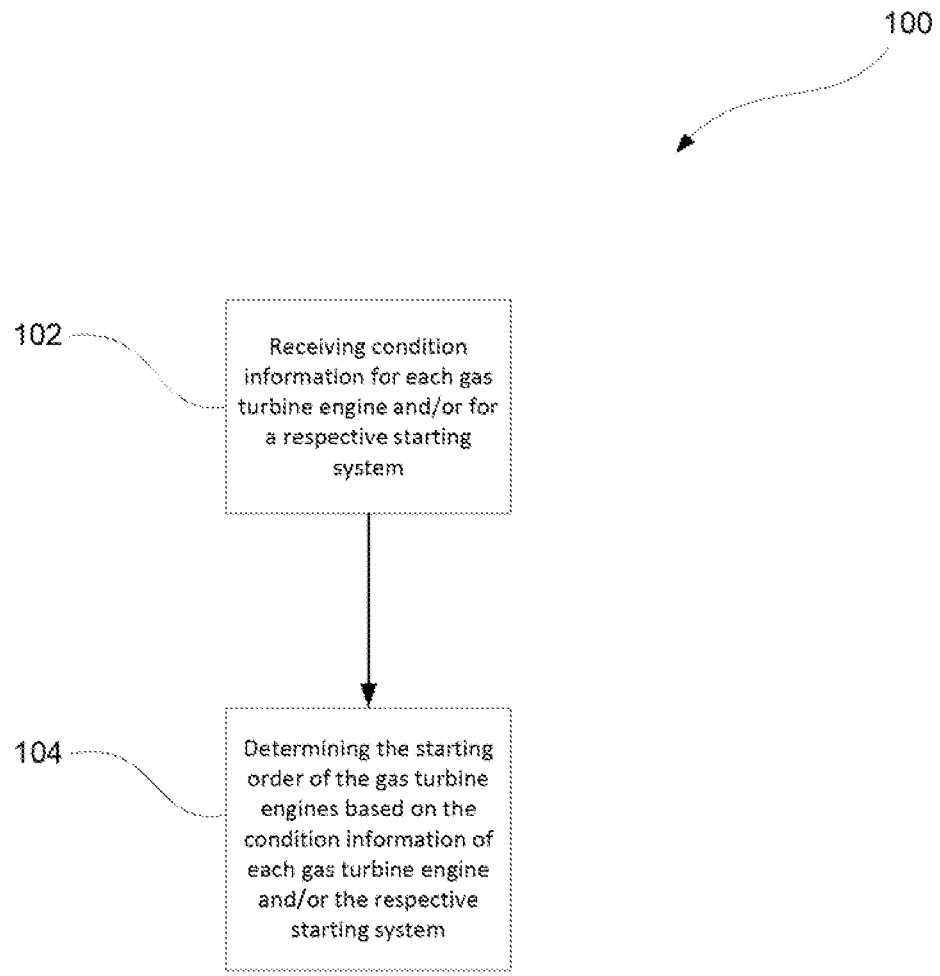
FIG. 4 is a flow diagram showing a method of determining a starting order of a plurality of gas turbine engines according to the present disclosure.

FIG. 4 is a flow diagram showing a method 100 of determining a starting order of a plurality of gas turbine engines, for example as in accordance with the examples discussed above with reference to FIG. 2. In a first step 102, the method comprises receiving condition information for each gas turbine engine of the plurality of gas turbine engines and/or for a respective starting system of each gas turbine engine. The condition information comprises at least one of health information for each gas turbine engine and/or the respective starting system; maintenance information for each gas turbine engine and/or the respective starting system; and operation information relating to an expected future usage of the gas turbine engine. In a second step 104, the method comprises determining the starting order of the plurality of gas turbine engines based on the condition information of each of the plurality of gas turbine engines and/or respective starting systems.

Figure 5:
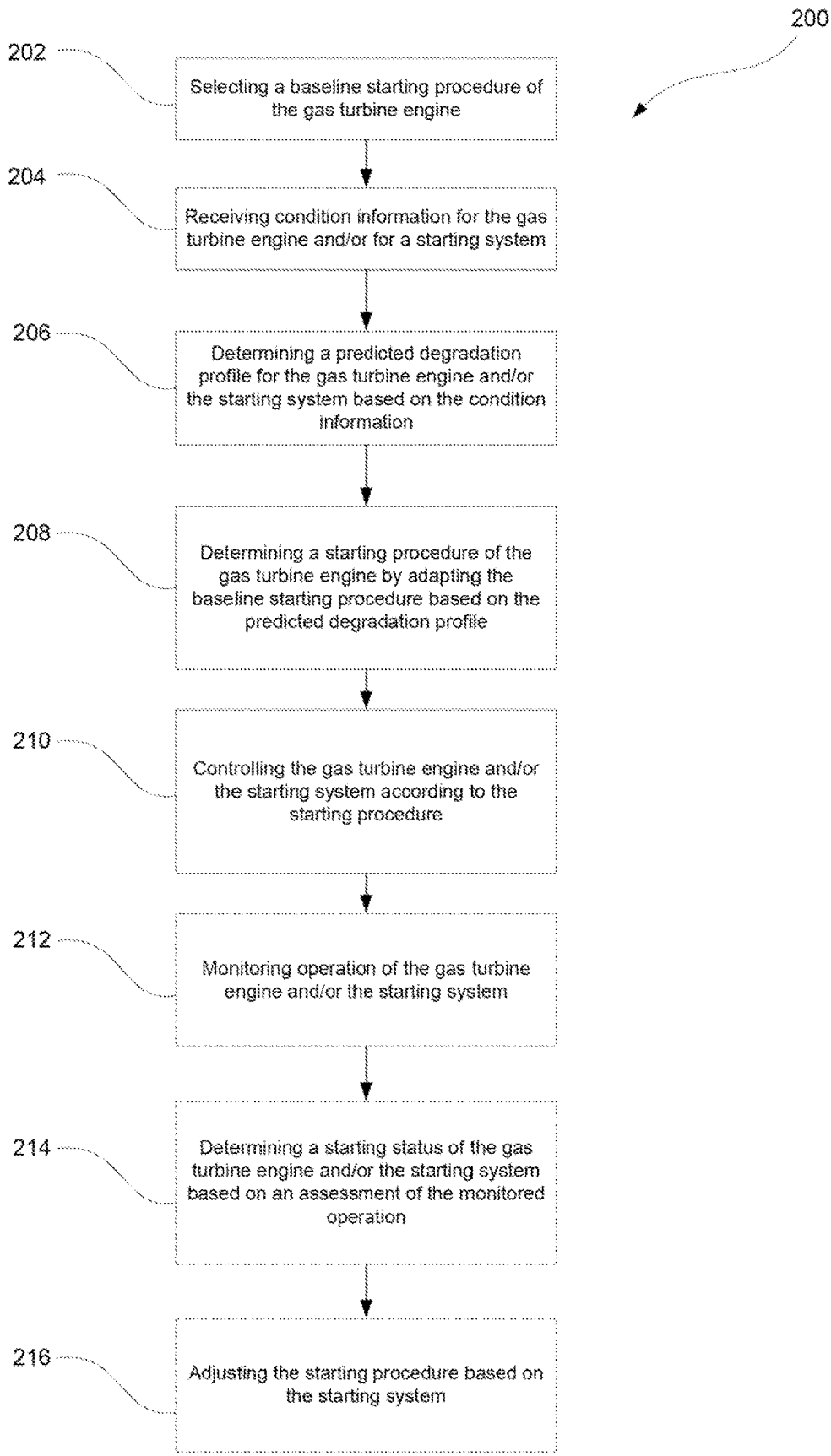
FIG. 5 is a flow diagram showing a method of starting a gas turbine engine according to the present disclosure.

FIG. 5 is a flow diagram showing a method 200 of starting a gas turbine engine, for example as in accordance with the examples discussed above with reference to FIG. 3. In a first step 202, the method comprises selecting a baseline starting procedure of the gas turbine engine, based on environmental data for an environment around the gas turbine engine. In a second step 204, the method comprises receiving condition information for the gas turbine engine and/or for a starting system of the gas turbine engine. The condition information comprises at least one of: health information for the gas turbine engine and/or the starting system; maintenance information for the gas turbine engine and/or the starting system; and operation information relating to an expected future usage of the gas turbine engine. In a third step 206, the method comprises determining a predicted degradation profile for the gas turbine engine and/or starting system based on the condition information. In a fourth step 208, the method comprises determining a starting procedure of the gas turbine engine by adapting the baseline starting procedure based on the predicted degradation profile. In a fifth step 210, the method comprises controlling the gas turbine engine and/or the starting system according to the determined starting procedure. Optionally, the method may further comprise, in a sixth step 212, monitoring operation of the gas turbine engine and/or the starting system during the starting procedure. Optionally, the method may further comprise, in a seventh step 214, determining a starting status of the gas turbine engine based on an assessment of the monitored operation with respect to the determined starting procedure. Optionally, the method may further comprise, in a eighth step 216, adjusting the starting procedure based on the starting status.

The method shown with reference to FIG. 5 may follow the method as described with reference to FIG. 4. When the starting order for a plurality of gas turbine engines has been determined by the method described in FIG. 4, a method of starting each of the plurality of gas turbine engines can be determined by the method as described in FIG. 5.

The systems and methods of the present disclosure enable more reliable starting of one or more gas turbine engines. The method and system of determining a starting order of a plurality of gas turbine engines based on condition information enables the starting order to be set such that the gas turbine engines and their respective starting systems degrade in an even manner across their operational life. This means that the operational life of components of the gas turbine engines and/or their respective starting systems will be substantially similar and can be replaced or repaired at similar time intervals. The use of condition information also enables the maintenance schedules of the gas turbine engines and/or their respective starting systems to be brought into alignment. This has the advantage that maintenance activities for the gas turbine engines and/or their respective starting system can be grouped together into fewer maintenance events, reducing overall aircraft downtime. The condition information can also indicate how each of the plurality of gas turbine engines and/or their respective starting systems has degraded, which enables the starting order to be set to account for any differences in degradation. This can also help to identify gas turbine engines and/or starting systems which may be faulty, even before a starting procedure is undertaken.

The method and system of starting a gas turbine engine based on condition information enables the starting of the gas turbine engine to be carried out reliably by detecting underlying faults at an early stage. By adapting fault limits based on the predicted degradation profile, false fault detection can be avoided, and more faults can be accurately detected. Therefore, reliability of the starting procedure is increased. By adapting the starting procedure based on real-time sensor data, the reliability of the starting procedure is further increased. A starting procedure can be aborted at an early stage due to early fault detection during the starting procedure, which can save time and cost associated with incorrectly conducting a full starting procedure on a faulty gas turbine engine and/or starting system. This also reduces the likelihood of future failures due to potential damage to components caused by incorrectly conducting the full starting procedure. Real-time environmental data can ensure that the starting procedure is adjusted so that the gas turbine engine and/or starting system can be correctly operated to avoid failure in real life conditions. In addition, the method and system enable the gas turbine engine and starting system to be flexibly operated to either conserve operational life or maximise performance, without compromising on reliability. This enables the number of failed starts to be reduced and the performance of the gas turbine engine and starting system to be maximised in a manner which is appropriate to the condition of the gas turbine engine and/or its starting system.

Although it has been described that the example system 24 as described with reference to FIG. 2 can perform the method 100 as described with reference to FIG. 4, it will be appreciated that the example system 24 as described with reference to FIG. 2 can also perform the method 200 as described with reference to FIG. 5.

Although it has been described that the gas turbine engine(s) are aircraft gas turbine engine(s), in other examples, the gas turbine engine(s) may be used for other applications. For example, the gas turbine engine(s) may be used for a marine vehicle or for power generation.

Although it has been described that the SIS and the processor are remote from the gas turbine engine and/or starting system, in other examples, the SIS and the processor may be part of the gas turbine engine and/or starting system.

Although in the example system described with reference to FIG. 2 it has been described that four gas turbine engines form the plurality of gas turbine engines, it will be appreciated that in other examples, the plurality of gas turbine engines can be any number of gas turbine engines exceeding one.

It will be understood that the disclosure is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A method of starting a gas turbine engine, comprising:
    selecting a baseline starting procedure of the gas turbine engine based on environmental data for an environment around the gas turbine engine;
    receiving condition information for the gas turbine engine and/or for a starting system of the gas turbine engine, the condition information comprising at least one of:
        health information for the gas turbine engine and/or the starting system;
        maintenance information for the gas turbine engine and/or the starting system; and
        operation information relating to an expected future usage of the gas turbine engine;
    determining a predicted degradation profile for the gas turbine engine and/or the starting system based on the condition information;
    determining a starting procedure of the gas turbine engine by adapting the baseline starting procedure based on the predicted degradation profile; and
    controlling the gas turbine engine and/or the starting system according to the determined starting procedure.

2. The method as claimed in claim 1, wherein adapting the baseline starting procedure comprises at least one of:
    adapting one or more fault limits for one or more starting parameters for the baseline starting procedure;
    adapting a torque-power relationship for the baseline starting procedure;
    adapting a fuel schedule for the baseline starting procedure; and
    adapting one or more variable geometry features of the gas turbine engine for the baseline starting procedure.

3. The method as claimed in claim 1, further comprising:
    monitoring operation of the gas turbine engine and/or the starting system during the starting procedure;
    determining a starting status of the gas turbine engine and/or starting system based on an assessment of the monitored operation with respect to the determined starting procedure; and
    adjusting the starting procedure based on the starting status.

4. The method as claimed in claim 3, further comprising:
    receiving updated environmental data; and
    adjusting the starting procedure based on the updated environmental data.

5. The method as claimed in claim 3, wherein adjusting the starting procedure based on the starting status comprises at least one of:
    adjusting the one or more fault limits of the starting procedure;
    adjusting the torque-power relationship of the starting procedure;
    adjusting the fuel schedule for the starting procedure;
    adapting the one or more variable geometry features of the gas turbine engine for the starting procedure; and
    aborting the starting procedure.

6. The method as claimed in claim 1, wherein the maintenance information comprises at least one of a time to a next scheduled maintenance event and a type of the next scheduled maintenance event.

7. The method as claimed in claim 6, wherein the operation information comprises an expected operation of the gas turbine engine until the next scheduled maintenance event.

8. The method as claimed in claim 1, wherein the health information comprises at least one of a degradation level and a remaining operational life of the gas turbine engine and/or starting system.

9. A system for starting a gas turbine engine, comprising:
    a starting system configured to start the gas turbine engine;
    processing circuitry coupled to the gas turbine engine and the starting system, the processing circuitry configured to execute instructions comprising:
        selecting a baseline starting procedure of the gas turbine engine based on environmental data for an environment around the gas turbine engine;
        receiving condition information for the gas turbine engine and/or for the starting system of the gas turbine engine, the condition information comprising at least one of:
            health information for the gas turbine engine and/or the starting system;
            maintenance information for the gas turbine engine and/or the starting system; and
            operation information relating to an expected future usage of the gas turbine engine;
        determining a predicted degradation profile for the gas turbine engine and/or the starting system based on the condition information;
        determining a starting procedure of the gas turbine engine by adapting the baseline starting procedure based on the predicted degradation profile; and
        controlling the gas turbine engine and/or the starting system according to the determined starting procedure.

10. The system as claimed in claim 9, further comprising at least one sensor configured to monitor operation of the gas turbine engine and/or the starting system during the starting procedure;
    wherein the instructions further comprise:
    determining a starting status of the gas turbine engine and/or the starting system based on an assessment of the monitored operation with respect to the determined starting procedure; and
    adjusting the starting procedure based on the starting status.

* * * * *